(12) United States Patent
Moll

(10) Patent No.: US 9,170,949 B2
(45) Date of Patent: Oct. 27, 2015

(54) SIMPLIFIED CONTROLLER WITH PARTIAL COHERENCY

(71) Applicant: QUALCOMM TECHNOLOGIES, INC., San Diego, CA (US)

(72) Inventor: Laurent Moll, San Jose, CA (US)

(73) Assignee: Qualcomm Technologies, Inc., San Diego, CA (US)

(*) Notice: Subject to any disclaimer, the term of this patent is extended or adjusted under 35 U.S.C. 154(b) by 105 days.

(21) Appl. No.: 14/040,643

(22) Filed: Sep. 28, 2013

(65) Prior Publication Data

US 2014/0108744 A1    Apr. 17, 2014

Related U.S. Application Data

(60) Provisional application No. 61/707,627, filed on Sep. 28, 2012.

(51) Int. Cl.
*G06F 12/08* (2006.01)

(52) U.S. Cl.
CPC .................................. *G06F 12/0831* (2013.01)

(58) Field of Classification Search
None
See application file for complete search history.

(56) References Cited

U.S. PATENT DOCUMENTS

| | | | |
|---|---|---|---|
| 5,317,720 | A | 5/1994 | Stamm et al. |
| 6,681,292 | B2 | 1/2004 | Creta et al. |
| 7,174,430 | B1 | 2/2007 | O'3 Krafka et al. |
| 8,296,525 | B1 | 10/2012 | O'Bleness et al. |
| 2002/0087811 | A1* | 7/2002 | Khare et al. ............... 711/146 |
| 2005/0132148 | A1 | 6/2005 | Arimilli et al. |
| 2005/0160240 | A1 | 7/2005 | Van Doren et al. |
| 2006/0224835 | A1* | 10/2006 | Blumrich et al. ............. 711/146 |
| 2006/0230237 | A1 | 10/2006 | Sakamoto |
| 2007/0005909 | A1 | 1/2007 | Cai et al. |
| 2007/0038814 | A1* | 2/2007 | Dieffenderfer et al. ....... 711/141 |
| 2007/0130382 | A1 | 6/2007 | Moll et al. |
| 2008/0209133 | A1 | 8/2008 | Ozer et al. |
| 2010/0058000 | A1 | 3/2010 | Moyer et al. |
| 2010/0064108 | A1 | 3/2010 | Harris et al. |
| 2010/0185821 | A1 | 7/2010 | Paver et al. |
| 2010/0287342 | A1 | 11/2010 | Greenberg et al. |
| 2013/0042077 | A1 | 2/2013 | Mannava et al. |
| 2014/0095807 | A1 | 4/2014 | Moll et al. |
| 2014/0095808 | A1 | 4/2014 | Moll et al. |
| 2014/0095809 | A1 | 4/2014 | Moll et al. |

FOREIGN PATENT DOCUMENTS

GB    2460337 A    12/2009

OTHER PUBLICATIONS

Martin MMK., et al., "Bandwidth Adaptive Snooping," Proceedings of the Eighth International Symposium on High-Performance Computer Architecture, 2002. pp. 251-262, Feb. 2-6, 2002.

* cited by examiner

*Primary Examiner* — Kris Rhu
(74) *Attorney, Agent, or Firm* — Muncy, Geissler, Olds & Lowe, P.C.

(57) ABSTRACT

A simplified coherency controller supports multiple exclusively active fully coherent agent interfaces and any number of active I/O (partially) coherent agent interfaces. A state controller determines which fully coherent agent is active. Multiple fully coherent agents can be simultaneously active during a short period of a transition of processing from one to another processor. Multiple fully coherent agents can be simultaneously active, though without a mutually consistent view of memory, which is practical in cases such as when running multiple operating systems on different processors.

36 Claims, 6 Drawing Sheets

SIMPLIFIED CONTROLLER WITH PARTIAL COHERENCY

CROSS REFERENCE AND RELATED APPLICATIONS

This application claims priority under 35 USC 119 from U.S. Provisional Application Ser. No. 61/707627 filed on Sep. 28, 2012, titled SIMPLIFIED CONTROLLER WITH PARTIAL COHERENCY, the entire disclosure of which is incorporated herein by reference.

FIELD OF THE INVENTION

The herein disclosed invention is related to computers and, more specifically, to shared data coherency controllers used within data processing chips.

BACKGROUND

Cache coherency is used to maintain the consistency of data in a distributed shared memory system. A number of agents, each usually comprising one or more caches, are connected through a fabric or a central cache coherency controller. This allows the agents to take advantage of the performance benefit of caches while still providing, among various agents, a consistent view of data within a shared physical address space.

Cache coherency protocols are usually based on acquiring and relinquishing permissions on sets of data, typically called cache lines containing a fixed amount of data (e.g. 32 or 64 bytes). Typical permissions are:

- None: the cache line is not in the agent and the agent has no permission to read or write the data.
- Readable: the cache line is in the agent and the agent has permission to read the cache line content stored locally. Multiple agents can simultaneously have read permission on a cache line (i.e. multiple readers).
- Readable and writable: the cache line is in the agent and the agent has permission to write (and typically read) the cache line content. Only one agent can have write permission on a cache line, and no other agent can have read permission at the same time.

There is usually a backing store for all cache lines (e.g. a DRAM). The backing store is the location where the data is stored when it is not in any of the caches. Data is constantly being updated or changed in the system. Thus, at any point in time, the data in the backing store may not be up to date with respect to the latest copy of a cache line, which may be in an agent. Because of this, cache lines inside agents often includes an indication of whether the cache line is clean (i.e. it has the same value as in the backing store) or dirty (i.e. it needs to be written back to the backing store eventually since it is the most up-to-date version).

The permission and "dirtiness" of a cache line in an agent is referred to as the "state" of the cache line. The most common set of coherency states is called MESI (Modified-Exclusive-Shared-Invalid), where Shared corresponds to the read permission (and the cache line being clean) and both Modified and Exclusive give read/write permissions, but in the Exclusive state, the line is clean, while in the Modified state, the line is dirty and must be eventually written back. In that state set, shared cache lines are always clean. There are more complex versions like MOESI (Modified-Owned-Exclusive-Shared-Invalid) where cache lines with read permission are allowed to be dirty. Other protocols may have separate read and write permissions. Many cache coherency state sets and protocols exist.

In the general case, when an agent needs a permission on a cache line that it does not have, it must interact with other agents directly or through a cache coherency controller to acquire the permission. In the simplest "snoop-based" protocols, the other agents must be "snooped" to make sure that the permission requested by the agent is consistent with the permissions already owned by the other agents. For instance, if an agent requests read permission and no other agent has write permission, the read permission can be granted. However, if an agent already has write permission, that permission must be removed from that agent first before it is granted to the original requester.

In some systems, the agent directly places snoop requests (also known as snoops) on a bus and all agents (or at least all other agents) respond to the snoop requests. In other systems, the agent places a permission request to a coherency controller, which in turn will snoop the other agents (and possibly the requesting agent itself).

In directory-based protocols, directories of permissions acquired by agents are maintained and snoops are sent only when permissions need to change in an agent. Snoop filters may also be used to reduce the number of snoops sent to agents. Snoop filters keep track of the content of the agents and do not send a snoop to an agent if it knows that the agent does not need to change its permissions.

Data and permissions interact in cache coherency protocols, but the way they interact varies. Agents usually place requests for both permission and data simultaneously, though not necessarily. For instance, in one case an agent that wants to place data in its cache for reading purposes and has neither the data nor the permission can place a read request including both the request for permission and for the data itself. However, in another case an agent that already has the data and read permission but needs write permission may place an "upgrade" request to write permission, but does not need data.

Likewise, responses to snoop requests can include an acknowledgement that the permission change has happened, but can also optionally contain data. The snooped agent may be sending the data as a courtesy. Alternatively, the snooped agent may be sending dirty data that has to be kept to be eventually written back to the backing store.

Agents can hold permission without data. For instance, an agent that wants to write a full cache line may not request data with the write permission, as it knows it will not use it (the agent will overwrite the data completely). In some systems, holding partial data is permitted (in quanta of sectors, bytes, or other units). This is useful to limit data transfers, though it makes the cache coherency protocol more complex.

Many cache coherency protocols provide two related ways for data to leave an agent. One is through the snoop response path, providing data as a response to a snoop. The other is a spontaneous write path (often called write back or evict path) where the agent can send the data out when it does not want to keep it anymore. In some protocols, the snoop response and write back paths are shared.

Fully coherent agents are capable of both owning permissions for cache lines and receiving snoop requests to check and possibly change their permissions, triggered by a request from another agent. A common type of fully coherent agent is a microprocessor with a coherent cache. As the microprocessor needs to do reads and writes, it acquires the appropriate permissions, and potentially data, and puts them in its cache. Many modern microprocessors have multiple levels of caches inside. Many modern microprocessors contain multiple microprocessor cores, each with its own cache, and often a shared second-level cache. Other types of agents may be fully coherent such as DSPs, GPUs and various types of multimedia agents comprising a cache.

In contrast, I/O coherent (also called one-way coherent) agents do not use a coherent cache, but they need to operate on a consistent copy of the data with respect to the fully coherent agents. As a consequence, their read and write request may trigger coherency actions (snoops) to fully coherent agents. In most cases, this is done by having either a special bridge or the central coherency controller issue the appropriate coherency action and sequence the actual reads or writes to the backing store if necessary. In the case of a small bridge, that bridge may act as a fully coherent agent holding permissions for a small amount of time. In the case of the central coherency controller, it tracks the reads and writes, and prevents other agents from accessing cache lines that are being processed on behalf of the I/O coherent agent.

Referring now to FIG. 1, cache coherent system 100 includes central coherency controller 102 where the requests from I/O agent 106 and coherent agents 108 and 110 trigger coherency resolution logic 104 to send snoops to coherent agents 108 and 110. In general, fully coherent agents use the full extent of the cache coherency protocol and interactions between fully coherent agents can be extremely complex. On the other hand, interactions triggered by I/O coherent agents, such as agent 106, are simpler as the number of combinations of requests and cache line states is limited, and there is no interaction the other way as I/O coherent agents are not snooped.

As a consequence, a system with one fully coherent agent and one or more I/O agent is fairly simple, while a system, such as the system 100, with two or more fully coherent agents is much more complex. A more complex system has a higher risk of bugs, is larger, requires more area, and has longer latency to respond to requests.

Referring now to FIG. 2, a process 200 starts at step 202 with a coherent requestor sending a coherent request to a coherency controller. At step 204, the coherency controller receives the coherency request and determines if data is part of the coherency request. The process 200 continues to step 206 if there is a data needed as part of the coherency request. At step 208, the coherency controller sends snoops to all coherent agents. At step 210, the snooped coherent agents send responses and data, if the data is valid. At step 212, the coherency controller collects the snoop responses to determine which response had data. If the snoop response(s) had no data, then the process moves to step 214. At step 216 the coherency controller sends a read to memory and at step 218 the memory provides the requested data to the coherent requestor and the coherent requestor completes the transaction at step 224. On the other hand, if at step 212, it is determined that a snoop response includes data at step 220, then at step 222 the coherency controller forwards the snoop data to the coherency requestor and the coherent requestor completes the transaction at step 224.

If at step 204 it is determined that the request does not need data, then the process 200 continues to step 236. At step 238, the coherency controller sends snoops to all coherent agents. At step 240, the snooped coherent agents send responses and data, if the data is dirty. At step 242, the coherency controller collects the snoop responses to determine which response had dirty data. If a snoop response had dirty data, then the process moves to step 244. At step 246 the coherency controller writes data to memory. At step 248 the coherency controller transmits a coherent response with no data to the coherency requestor. At step 250, the coherent requestor receives the response and completes the transaction. If at step 242 it is determines that the snoop response has no data, then the process 200 continues to step 252 and then to step 248 as noted above.

Therefore, what is needed is a simpler coherency controller that supports two or more fully-coherent agents and one or more I/O coherent agent.

SUMMARY OF THE INVENTION

The herein disclosed invention is a simplified coherency controller, system using such a controller, and method of its operation. The system includes the coherency controller, an I/O agent, and at least two fully coherent agents that operate independently and at different times. Each agent is connected to the coherency controller through an interface and communicates using a coherency protocol.

By supporting coherency between the I/O agent and a single fully-coherent agent at a time, complexity of the required protocol and complexity of the logic of the coherency controller and agent interfaces is reduced. This has the benefit of a lower risk of bugs, smaller size and power consumption, and less latency for accesses through the controller.

BRIEF DESCRIPTION OF THE DRAWINGS

Various aspects of the invention will become more apparent from the detailed description set forth below when taken in conjunction with the drawings, in which like elements bear like reference numerals.

DETAILED DESCRIPTION

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the invention, representative illustrative methods and materials are now described.

Figure 3:
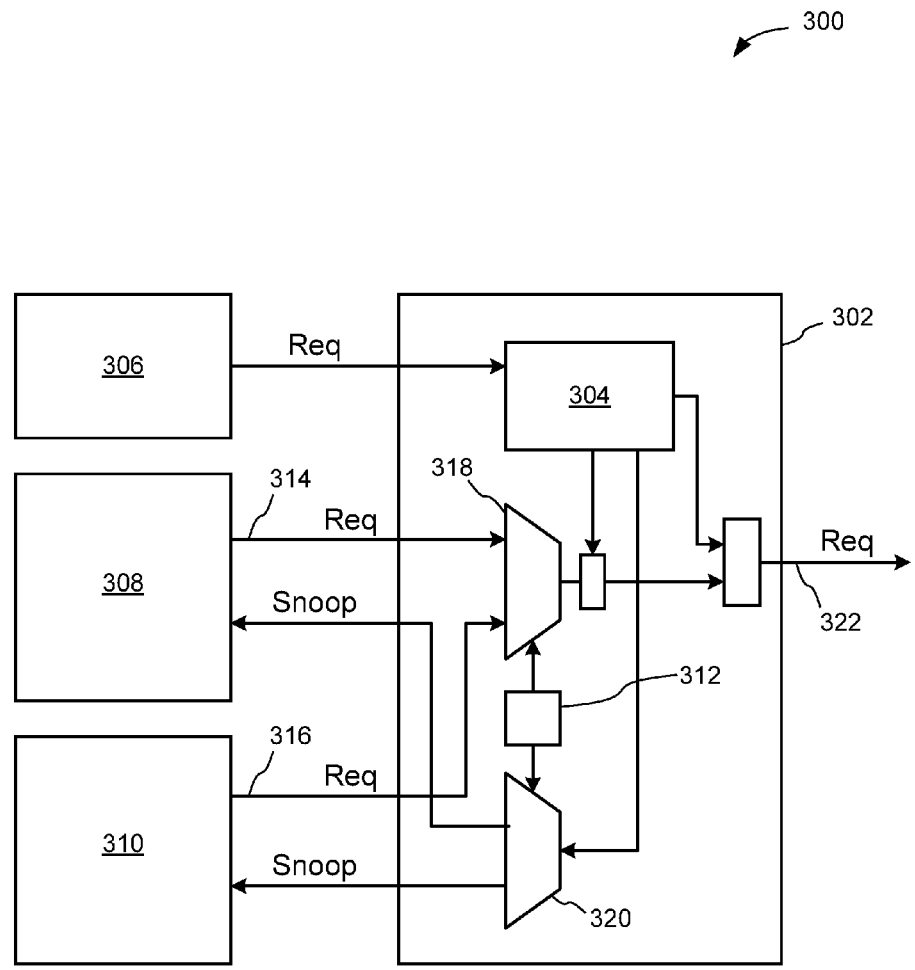
FIG. 3 shows a system in accordance with the teachings of the invention, with two coherent agents.

Referring now to FIG. 3, a system 300 is shown in accordance with various aspects of the invention. The system 300 includes a coherency controller 302, I/O coherent agent 306, and two fully coherent agents 308 and 310. Agents 308 and 310 function independently and at different times. According to some aspects of the invention, agent 308 is a high-performance agent and agent 310 is a low-power agent. Both provide similar functionality, but with different characteristic of power consumption and performance. In accordance with an aspect of the invention, high-performance agent 308 is used when high levels of processing are required and low-power agent 310 is used when low levels of processing are required. According to some aspects of the invention, the agents are microprocessors.

The system 300 also includes state controller 312. The state controller 312 keeps track of which fully coherent agent is currently active. In accordance with an aspect of the invention, both agents 308 and 310 may be inactive. In accordance with yet another aspect of the invention one or both of the agents 308 and 310 may be active. Request interface 314 and 316 from the fully coherent agents 308 and 310, respectively, are combined together. Request interface 314 is only active if agent 308 is active and request interface 316 is only active if agent 310 is active. According to an aspect of the invention, the combination of request paths 314 and 316 is done by multiplexer 318, controlled by the state controller 312, so that at any point in time only one fully coherent agent can send requests. Likewise, requests from the I/O coherent agent 306 can generate snoops. The snoops are sent to one fully coherent agent through dispatcher 320, controlled by state controller 312. According to an aspect of the invention, state controller 312 comprises one or more configuration bits indicating which of the request paths 314 and 316 are active. According to some aspects of the invention, a state controller can be as simple as a single flip-flop or a single input port. According to some aspects of the invention, the one or more configuration bits can be programmed. According to some aspects of the invention, state controller 312 comprises an input indicating which of request paths 314 and 316 are active.

According to some aspects of the invention, requests from fully coherent agents 308 and 310 can be stalled by coherency resolution logic 304 if the cache lines corresponding to the requests are already being processed on behalf of I/O coherent agent 306.

According to some aspects of the invention, the handling of requests from fully coherent agents 308 or 310, in particular the content of the corresponding requests sent to a connected slave on secondary interface 322, does not depend on the coherent state of the line in the system 300, but just on the original request from the fully coherent agent. According to some aspects of the invention, a static table is used to convert requests received from fully coherent agents 308 and 310 into requests on secondary interface 322. According to some aspects of the invention, some requests from fully coherent agents 308 and 310 can be responded to by coherency controller 304, for example requests that do not ask for data.

The logic of the system 300 is much simplified in comparison to a system with full coherence between simultaneously active fully coherent agents. This is because only the requests from I/O coherent agent 306 can trigger snoops to fully coherent agents 308 or 310 and, at any point in time, snoops are sent to only one of fully coherent agents 308 and 310.

In some cases, systems with multiple fully-coherent agents do not need coherency between the fully-coherent agents (although they may need coherency between I/O coherent agents and the fully coherency agents). One example of such a system is where no more than one fully coherent agent operates at any one time. Another example would be when the various fully-coherent agents run different operating systems and do not need to support transparent thread migration from one agent to another.

Figure 4:
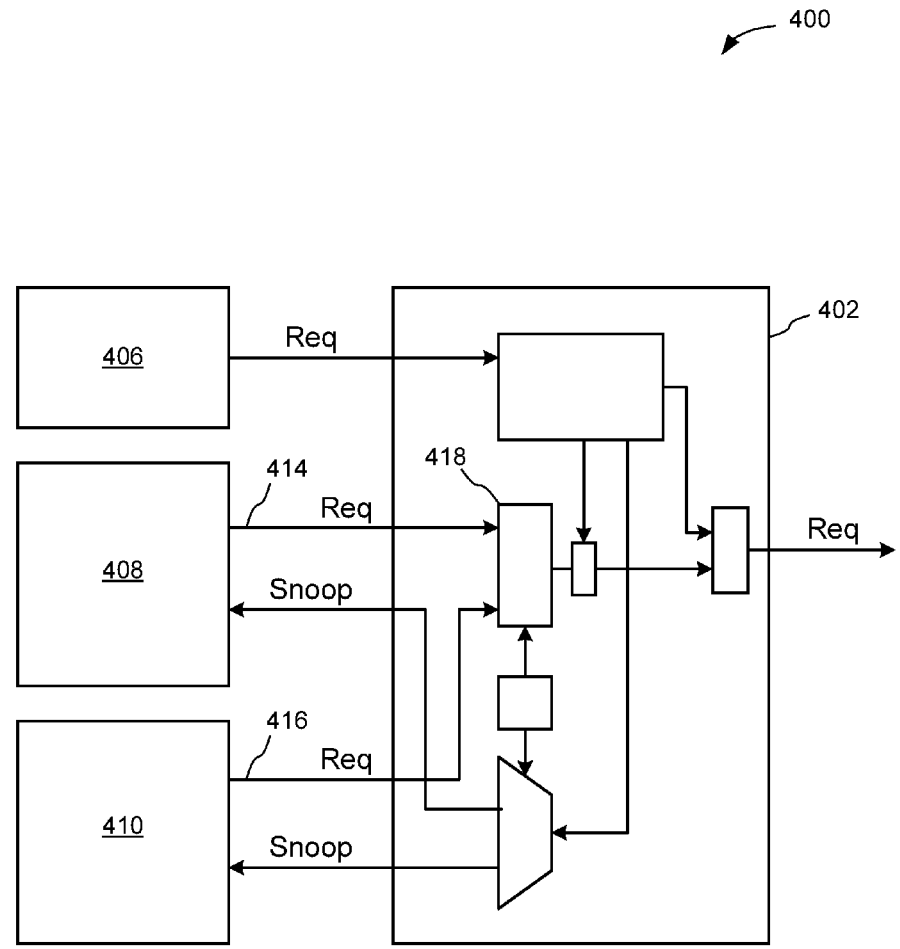
FIG. 4 shows a system in accordance with the teachings of the invention with two coherent agents.

Referring now to FIG. 4, a system 400 is shown in accordance with another aspect of the invention. The system 400 includes a coherency controller 402, I/O coherent agent 406, and fully coherent agents 408 and 410 that send requests simultaneously. In accordance with an aspect of the invention, at most one of the agents 408 and 410 can contain cached data at any point in time. Therefore, at most one of the agents 408 and 410 needs to be snooped at any point in time. This is useful, for instance, if the two coherent agents are generally not active simultaneously, but the transition from one to the other requires both to be briefly active simultaneously. In this case, request paths 414 and 416 are coupled with a logic unit 418 that merges the request traffic of the two fully coherent agents 408 and 410, respectively. Because request paths 414 and 416 can be active at the same time, the logic unit 418 must actively merge requests from request paths 414 and 416, unlike multiplexer 318 shown in FIG. 3. The coherency logic of system 400 is still simple as the coherent agents 408 and 410 do not snoop each other, and only one coherent agent 408 or 410 gets snooped when requests from the I/O agent 406 are received.

Figure 5:
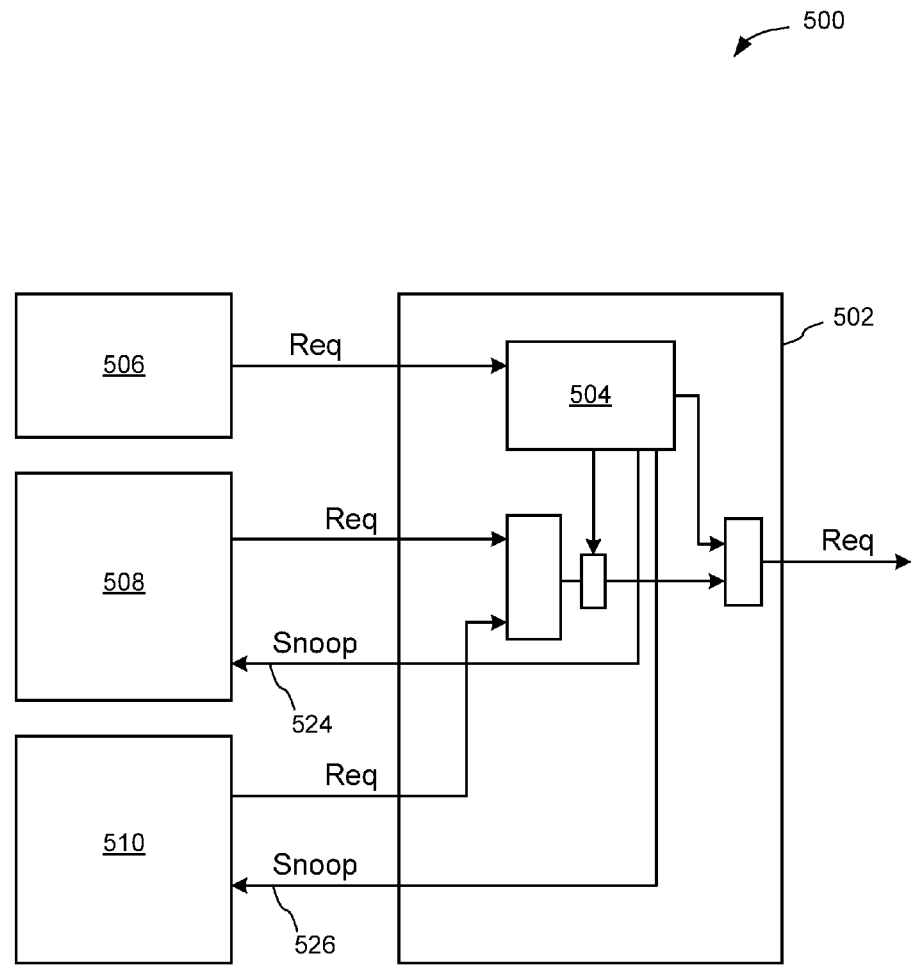
FIG. 5 shows a system in accordance with the teachings of the invention with two coherent agents.

Referring now to FIG. 5, a system 500 is shown according to another aspect of the invention. The system 500 includes a coherency controller 502, I/O coherent agent 506, and fully coherent agents 508 and 510. Fully coherent agents 508 and 510 can be active and hold cacheable data simultaneously, but do not require coherency between them. This is useful for instance when different operating systems or instances of operating systems are run on each fully coherent agent 508 and 510. In this case, coherency resolution logic 504 handles and sends snoops on snoop interfaces 524 and 526 to coherent agents 508 and 510, respectively, and handles the associated snoop responses. Coherency resolution logic 504 of the system 500 is still in accordance with the object to the invention because coherent agents 508 and 510 do not snoop each other, and only one of the coherent agents 508 and 510 gets snooped when requests are received from I/O agent 506.

According to some aspects of the invention, the system 500 can also allow limited coherency between the coherent agents 508 and 510. For instance, the equivalent of I/O (one-way) coherency can be provided, so that one coherent agent can get the latest copy of a cache line from the other fully coherent agent while still not needing to acquire ownership from or maintain ownership consistency with the other fully coherent agent.

Figure 1:
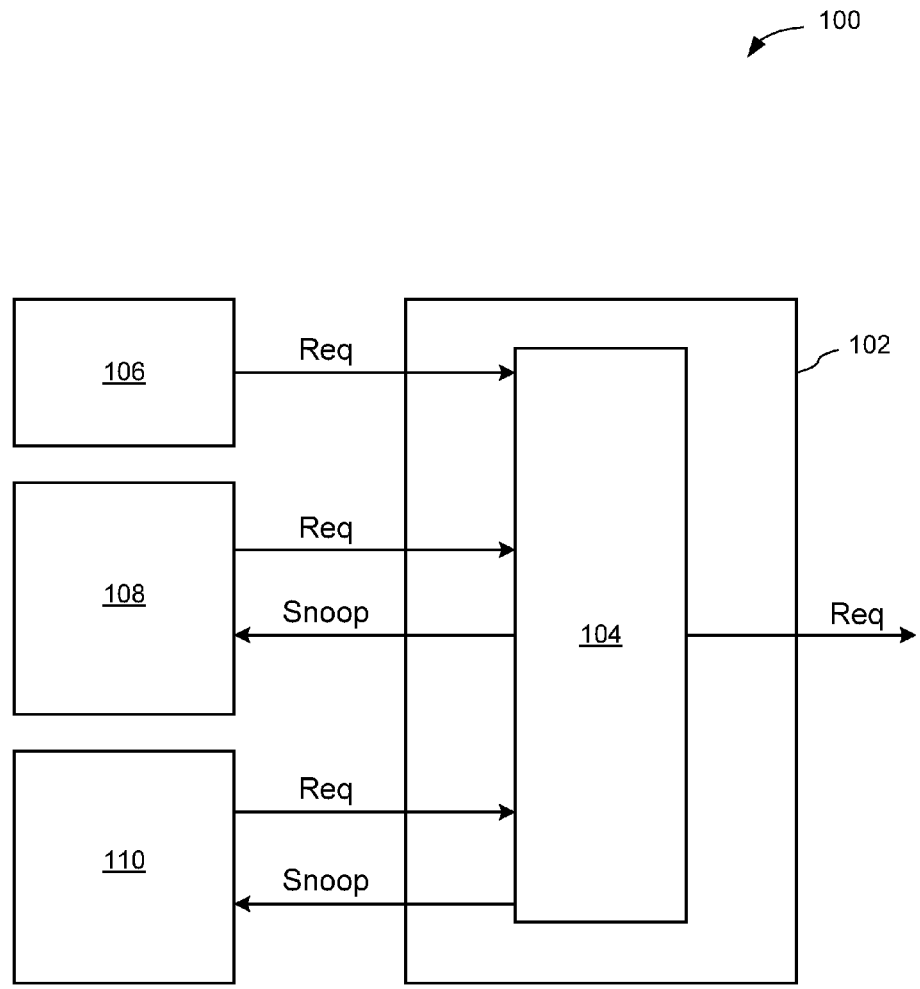
FIG. 1 shows a system with a central coherency controller.
Figure 2:
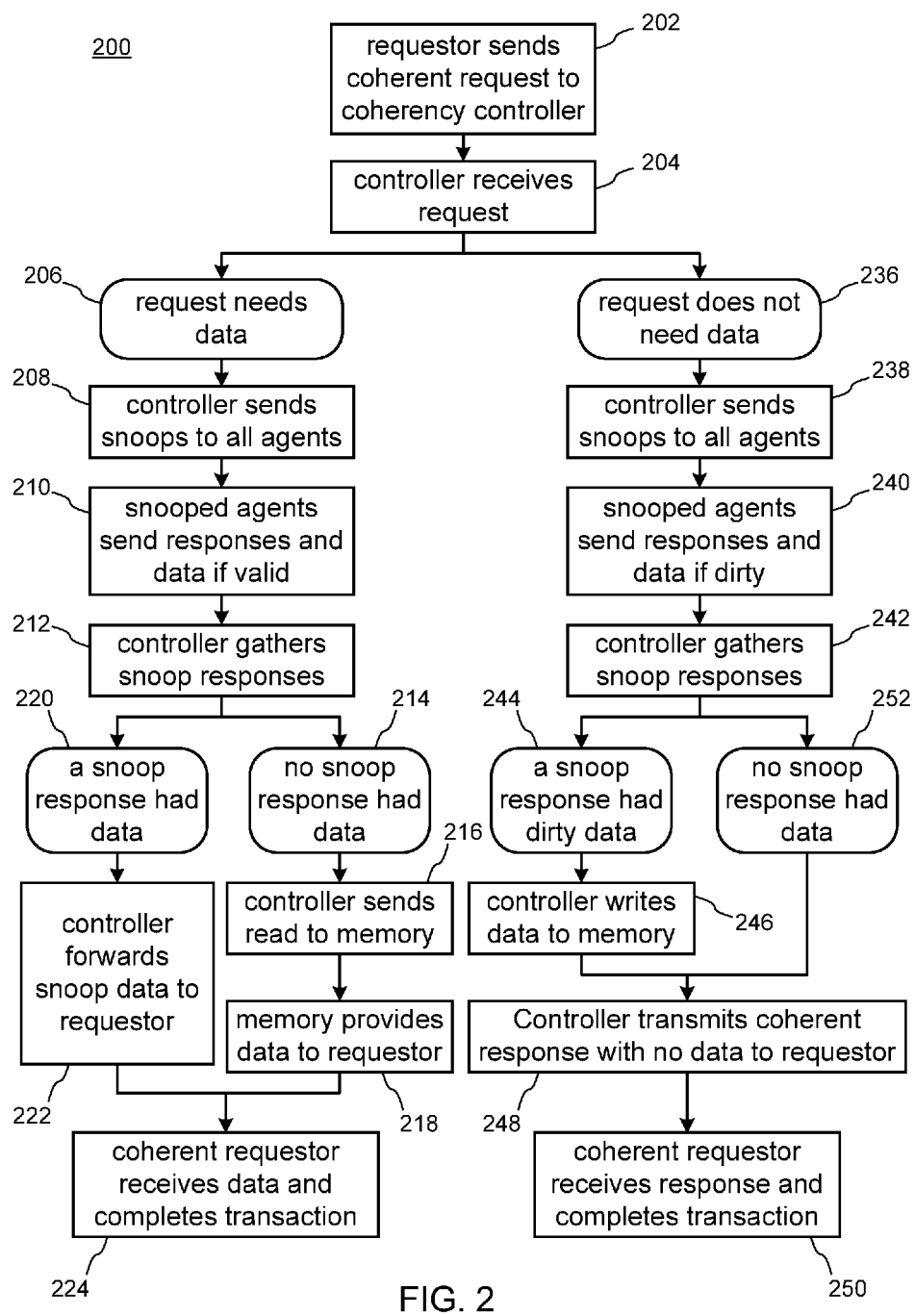
FIG. 2 shows a complex process flow for a full coherency system.
Figure 6:
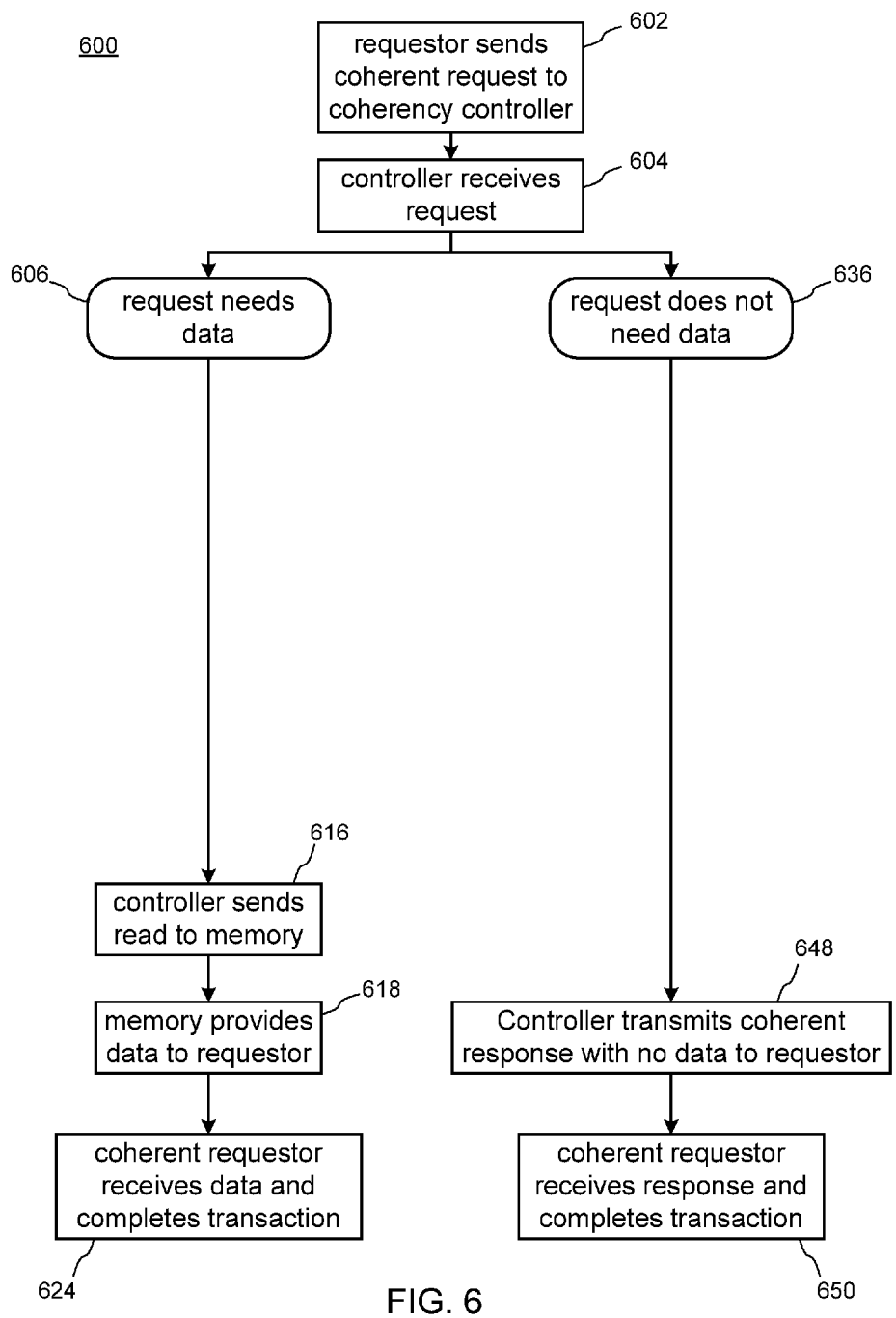
FIG. 6 shows a process flow for a coherency system in accordance with the teachings of the invention.

Referring now to FIG. 6, operation of a coherency controller, which is in accordance with the various aspects of the invention, is shown with partial coherency as process 600. The process 600 begins at step 602 with a requestor sending a request to the coherency controller. As noted above, only one coherent agent is snooped. Thus, the process is simplified in comparison to the process of maintaining coherency between two or more fully coherent agents as shown on FIG. 2. At step 604 the coherency controller receives the request and processes the request to determine if the request needs data. At the step 606 it is determined that the request needs data and the process passes to step 616 where the coherency controller send the request to memory. In accordance with an aspect of the invention, the memory location may be the coherent agent that is snooped. In accordance with another aspect of the invention, the memory may be a backing store such as a DRAM chip. At step 618, the memory provides the data to the coherency controller, which in turn provides it to the requestor and the transaction is completed at step 624. On the other hand, if after the coherency controller receives and processes the request at step 604 and it is determined, at step 636, that the request does not need data, then the process moves to step 648 wherein the coherency controller transmits a coherent response without data to the requestor, which completes the transaction at step 650.

As will be apparent to those of skill in the art upon reading this disclosure, each of the aspects described and illustrated herein has discrete components and/or features that may be readily separated from or combined with other features and/or aspects to form embodiments, without departing from the scope or spirit of the invention. Any recited method can be carried out in the order of events recited or in any other order which is logically possible.

Reference throughout this specification to "one aspect," "various aspects," "an aspect," or similar language means that a particular feature, structure, or characteristic described in connection with the invention is included in at least one aspect or embodiment of the invention. Thus, appearances of the phrases "in one aspect," "in various aspects," "in certain aspects," and similar language throughout this specification may, but do not necessarily, all refer to the same of the invention. Unless defined otherwise, all technical and scientific terms used herein have the same meaning as commonly understood by one of ordinary skill in the art to which this invention belongs. Any methods and materials similar or equivalent to those described herein can also be used in the practice or testing of the invention.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates which may need to be independently confirmed.

In accordance with the teachings of the invention, a computer and a computing device are articles of manufacture. Other examples of an article of manufacture include: a controller, a requestor, an agent, a target, an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device) includes, in context, a non-transitory computer readable medium or storage that includes a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor, in turn, executes the computer readable program code to create or amend an existing computer-aided design using a tool. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement either a control system either in logic or via a set of commands executed by a soft-processor.

Accordingly, the preceding merely illustrates the various aspects and principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the invention, therefore, is not intended to be limited to the various aspects discussed and described herein. Rather, the scope and spirit of invention is embodied by the appended claims.

What is claimed is:

1. A coherency controller comprising:
   coherency resolution logic;
   a first interface enabled to be connected to a first agent;
   a second interface enabled to be connected to a second agent;
   a third interface enabled to be connected to a third agent; and
   a state controller in communication with the coherency resolution logic, wherein coherent requests received from the first interface cause the coherency resolution logic to send a snoop request alternatively to the second interface or the third interface, as determined by the state controller, wherein coherent requests received from the second interface do not cause the coherency resolution logic to send a snoop to any interface and requests received from the third interface do not cause the coherency resolution logic to send a snoop to any interface.

2. The coherency controller of claim 1 wherein the first interface is enabled to connect to at least one I/O coherent agent.

3. The coherency controller of claim 1 wherein the second interface is enabled to connect to at least one fully coherent agent.

4. The coherency controller of claim 3 wherein the fully coherent agent comprises at least one microprocessor core.

5. The coherency controller of claim 1 further comprising at least one secondary interface enabled to connect to at least one slave.

6. A coherency controller comprising:
   coherency resolution logic;
   a first interface enabled to be connected to a first agent;
   a second interface enabled to be connected to a second agent;
   a third interface enabled to be connected to a third agent; and a state controller in communication with the coherency resolution logic, wherein coherent requests received from the first interface cause the coherency resolution logic to send a snoop request alternatively to the second interface or the third interface, as determined by the state controller, and wherein the second interface and the third interface are never active simultaneously.

7. The coherency controller of claim 6 wherein only requests received on alternatively the second interface or the third interface are accepted, as determined by the state controller.

8. A coherency controller comprising:
coherency resolution logic;
a first interface enabled to be connected to a first agent;
a second interface enabled to be connected to a second agent;
a third interface enabled to be connected to a third agent;
at least one secondary interface enabled to connect to at least one slave; and
a state controller in communication with the coherency resolution logic, wherein coherent requests received from the first interface cause the coherency resolution logic to send a snoop request alternatively to the second interface or the third interface, as determined by the state controller, and wherein the requests received from the second interface are converted to requests sent on the secondary interface.

9. The coherency controller of claim 8 wherein the conversion uses a static table and does not depend on a state of any cache line.

10. A non-transient computer readable medium with program code that, when executed by a computer, cause it to model the performance of the coherency controller by at least the following steps:
receive coherent requests on a first interface;
receive coherent requests on a second interface; and
cause snoop requests to be sent on a third interface based on coherent requests received on the first interface;
prevent snoop requests from being sent on the third interface based on the coherent requests received on the second interface, wherein coherent requests received from the second interface do not cause the coherency resolution logic to send a snoop to any interface and requests received from the third interface do not cause the coherency resolution logic to send a snoop to any interface.

11. The non-transient computer readable medium of claim 10, wherein the first interface is enabled to connect to at least one I/O coherent agent.

12. The non-transient computer readable medium of claim 10, wherein the second interface is enabled to connect to at least one fully coherent agent.

13. The non-transient computer readable medium of claim 12, wherein the fully coherent agent comprises at least one microprocessor core.

14. The non-transient computer readable medium of claim 10, wherein at least one secondary interface is enabled to connect to at least one slave.

15. A simplified coherency controller comprising:
a first coherent agent interface;
a second coherent agent interface;
a third coherent agent interface;
an I/O agent interface; and
a dispatcher configured to send snoops from the I/O agent interface to alternatively one of the first coherent agent interface and the second coherent agent interface, wherein coherent requests received from the second coherent agent interface do not cause the coherency resolution logic to send a snoop to any interface and requests received from the third coherent agent interface do not cause the coherency resolution logic to send a snoop to any interface.

16. The simplified coherency controller of claim 15, wherein the first coherent agent interface is enabled to connect to at least one I/O coherent agent.

17. The simplified coherency controller of claim 15, wherein the second coherent agent interface is enabled to connect to at least one fully coherent agent.

18. The simplified coherency controller of claim 17, wherein the fully coherent agent comprises at least one microprocessor core.

19. The simplified coherency controller of claim 15, further comprising at least one secondary interface enabled to connect to at least one slave.

20. A simplified coherency controller comprising:
a first coherent agent interface;
a second coherent agent interface;
a third coherent agent interface;
an I/O agent interface; and
coherency resolution logic in communication with each of the agent interfaces and configured to send snoops that are received from the I/O agent interface to at least one of the first coherent agent and the second coherent agent, wherein coherent requests received from the second coherent agent interface do not cause the coherency resolution logic to send a snoop to any interface and requests received from the third coherent agent interface do not cause the coherency resolution logic to send a snoop to any interface.

21. The simplified coherency controller of claim 20, wherein the first coherent agent interface is enabled to connect to at least one I/O coherent agent.

22. The simplified coherency controller of claim 20, wherein the second coherent agent interface is enabled to connect to at least one fully coherent agent.

23. The simplified coherency controller of claim 22, wherein the fully coherent agent comprises at least one microprocessor core.

24. The simplified coherency controller of claim 20, further comprising at least one secondary interface enabled to connect to at least one slave.

25. A non-transient computer readable medium with program code that, when executed by a computer, cause it to model the performance of the coherency controller by at least the following steps:
receive coherent requests on a first interface;
receive coherent requests on a second interface; and
cause snoop requests to be sent on a third interface based on coherent requests received on the first interface;
prevent snoop requests from being sent on the third interface based on the coherent requests received on the second interface, wherein the second interface and the third interface are never active simultaneously.

26. The non-transient computer readable medium of claim 25, wherein only requests received on alternatively the second interface or the third interface are accepted, as determined by the state controller.

27. A non-transient computer readable medium with program code that, when executed by a computer, cause it to model the performance of the coherency controller by at least the following steps:
receive coherent requests on a first interface;
receive coherent requests on a second interface; and cause snoop requests to be sent on a third interface based on coherent requests received on the first interface;

prevent snoop requests from being sent on the third interface based on the coherent requests received on the second interface, wherein at least one secondary interface is enabled to connect to at least one slave, and wherein the requests received from the second interface are converted to requests sent on the secondary interface.

28. The A non-transient computer readable medium of claim 27, wherein the conversion uses a static table and does not depend on a state of any cache line.

29. A simplified coherency controller comprising:
a first coherent agent interface;
a second coherent agent interface;
a third coherent agent interface;
an I/O agent interface; and
a dispatcher configured to send snoops from the I/O agent interface to alternatively one of the first coherent agent interface and the second coherent agent interface, wherein the second interface and the third interface are never active simultaneously.

30. The simplified coherency controller of claim 29, wherein only requests received on alternatively the second coherent agent interface or the third coherent agent interface are accepted, as determined by the state controller.

31. A simplified coherency controller comprising:
a first coherent agent interface;
a second coherent agent interface;
a third coherent agent interface;
an I/O agent interface; and
a dispatcher configured to send snoops from the I/O agent interface to alternatively one of the first coherent agent interface and the second coherent agent interface; and
at least one secondary interface enabled to connect to at least one slave, wherein requests received from the second coherent agent interface are converted to requests sent on the secondary interface.

32. The simplified coherency controller of claim 31, wherein the conversion uses a static table and does not depend on a state of any cache line.

33. A simplified coherency controller comprising:
a first coherent agent interface;
a second coherent agent interface;
a third coherent agent interface;
an I/O agent interface; and
coherency resolution logic in communication with each of the agent interfaces and configured to send snoops that are received from the I/O agent interface to at least one of the first coherent agent and the second coherent agent, wherein the second interface and the third interface are never active simultaneously.

34. The simplified coherency controller of claim 33, wherein only requests received on alternatively the second coherent agent interface or the third coherent agent interface are accepted, as determined by the state controller.

35. A simplified coherency controller comprising:
a first coherent agent interface;
a second coherent agent interface;
a third coherent agent interface;
an I/O agent interface; and
coherency resolution logic in communication with each of the agent interfaces and configured to send snoops that are received from the I/O agent interface to at least one of the first coherent agent and the second coherent agent; and
at least one secondary interface enabled to connect to at least one slave, wherein requests received from the second coherent agent interface are converted to requests sent on the secondary interface.

36. The simplified coherency controller of claim 35, wherein the conversion uses a static table and does not depend on a state of any cache line.

* * * * *